United States Patent [19]

Anderson et al.

[11] Patent Number: 4,701,772
[45] Date of Patent: Oct. 20, 1987

[54] THERMALLY ACTIVATED IMAGE BAR

[75] Inventors: Robert W. Anderson, Fairport; Michael Poleshuk, Webster, both of N.Y.

[73] Assignee: Xerox Corporation, Stamford, Conn.

[21] Appl. No.: 935,653

[22] Filed: Nov. 26, 1986

[51] Int. Cl.[4] ............................................. G01D 15/14
[52] U.S. Cl. ..................................... 346/160; 350/354
[58] Field of Search ................................ 350/353–354, 350/286; 346/160, 107 R, 108; 358/302; 428/1; 400/114; 355/5

[56] References Cited

U.S. PATENT DOCUMENTS 4,370,029 1/1983 Sprague et al. ..................... 350/353
4,635,082 1/1987 Pomoto ............................... 346/160

Primary Examiner—Arthur G. Evans
Attorney, Agent, or Firm—Robert A. Chittum

[57] ABSTRACT

A thermally activated image bar is disclosed for use in an electrophotographic printer. The image bar comprises at least one transparent prism having a surface closely spaced and parallel with a confronting surface of a transparent member containing an array of transparent heating elements and addressing electrodes thereon to form a gap therebetween. A liquid medium also capable of transmitting light and having an index of refraction matched to that of at least one prism is positioned in the gap. An optical shield bonded to one of the confronting surfaces has at least one aperture aligned with the heating elements to improve optical contrast. This assembly is hermetically sealed within a transparent housing and means are optionally provided to circulate the liquid medium. The heating elements are selectively energized in response to digitized data signals for pulse heating the portions of the liquid medium in the vicinity thereof to form momentary bubbles. The bubbles cause changes in the index of refraction of the medium in the gap, so that selected portions of a sheet of light directed through the prism and into the bubbles are deflected or modulated by the mechanism of total internal reflection. The modulated light may be blocked by a stop or shutter and the unmodulated light may be directed to the precharged photoconductive member of the printer to form latent images or vice versa. Several configurations of the image bar are disclosed for producing latent electrostatic images on a photoconductive member one line of picture elements or pixels at a time. In one embodiment, the optical shield contains a plurality of tunnels which are aligned with the heating elements, so that the bubbles produce a self-pumping action that causes circulation of the liquid medium.

15 Claims, 10 Drawing Figures

THERMALLY ACTIVATED IMAGE BAR

BACKGROUND OF THE INVENTION

1. Field of the Invention

This invention relates to an image bar having an array of thermally activated dot shutters or light valves, and more particularly, to an image bar having a pair of confronting prisms containing a layer of liquid and an array of transparent heating elements therebetween. This liquid has an index of refraction substantially matched to that of the prisms, so that light passing through the prisms may be re-directed by total internal reflection upon the selective activation of the heating elements which produce temporary bubbles that displaces the liquid from the critical optical interface.

2. Description of the Prior Art

U.S. Pat. No. 3,730,608 to Castegnier discloses a light modulation system employing the use of an electrolytic substance. With reference to FIG. 4, when electrode 10 is electrically energized, a gas medium 8 is formed in electrolyte 2 that contacts with the face of prism 16. When light beam 19 enters into the system, it is totally reflected at the interface of gas medium 8. When electrode 10 is not energized, gas medium 8 disperses and light beam 9 passes through the electrolyte without substantial reflection.

U.S. Pat. No. 4,148,563 to Herbert discloses a panel which may be either transparent or reflective. As shown in FIG. 1, the panel is composed of two mated transparent layers, the confronting surfaces of which have V-shaped ridges and a film of liquid therebetween. The index refraction of the liquid is nearly that of the layers so that an incident ray of light will be transmitted therethrough. If the fluid is vaporized the incoming light will be reflected. Thus, whether the panel is transmissive or reflective, depends upon the temperature of the fluid sandwiched between the mated layers.

An article entitled "A Liquid-Vapor Display" by George W. Taylor, Proceedings of the IEEE, Vol. 61, No. 2, February 1973, discloses a reflective display having a roughened glass surface wetted with a transparent volatile liquid of the same refractive index as the glass panels sandwiching the liquid. The electrical heating via transparent electrodes of a thin film of liquid adjacent to the roughened surface transforms the glass into a light scattering surface. Referring to FIG. 1, incoming light will pass through the display to the black background. However, when the transparent electrodes are energized, vapor bubbles form around the roughened surface. This causes the incoming light to scatter before reaching the black background.

An article entitled "Liquid Evaporation Light Deflector", by George W. Taylor, Applied Optics, Vol. 11, No. 3, March 1972, discloses a digital light deflector which is based on the electrically controlled vaporization of a high refractive index transparent liquid at an inclined interface formed by the liquid in a transparent solid. Deflectors operating on this principle can be designed to provide multiple position linear or angular displacement of a light beam in one or two dimensions. Such deflectors can be random-accessed, are capable of large angular deflection, occupy a small volume, and should have a long operating life. Millisecond deflection is possible at power levels of 0.3 W/mm² of light beam area. The deflectors have high optical transmission efficiency with on/off contrast ratios of 150:1 and higher.

An article entitled "Fully Optical Switch Looms for Video", Electronics, Feb. 10, 1986, discusses a liquid dielectric optical switch by Thomson-CSF Central Research Laboratory. A liquid dielectric optical switch referred to as "Lidos", is based on the reflection of light within a prism and electrically induced motion of a dielectric liquid. The switch consists of two prisms with their hypotenuses parallel at a distance of from 10 to 30 microns. Each hypotenuse surface has a pair of transparent electrodes. Optical fibers are coupled to three of the four sides of the prisms by way of lenses, each aimed at the center electrode on its respective prism. One fiber is input, the others output. Movement of a droplet of liquid dielectric from one set of facing electrodes to the other controls the direction of the output signal. When the space between the two center electrodes is empty, internal reflection at the hypotenuse of the prism switches light entering one side of a prism at a 90 degree angle toward the other surface of the same prism for injection into its respective output fiber. When the space between the two center electrodes is occupied by the liquid dielectric, the refractive property of the prism's hypotenuse is cancelled and the light passes through the facing prism into the opposite output fiber.

U.S. Pat. No. 3,623,795 to George W. Taylor discloses an electro-optical system embodying a material whose optical properties change sharply in a small temperature range. The material is heat biased to a temperature in or close to this range and a beam of light is directed at the material. In response to a signal applied to the material, its temperature is changed through a relatively small range, such as from a value on one side to a value on the other side of a certain critical temperature and the change in optical properties of the material which results sharply changes a characteristic such as deflection angle, polarization direction, or other parameter of the light beam.

U.S. Pat. No. 3,303,332 to George W. Taylor discloses a light modulator and display device which can be switched between a light scattering and non-light scattering condition comprising a volatile liquid in a container, said container having a front viewing face of a transparent material with a thin transparent electrically resistive coating thereon. This coating is used for heating the volatile liquid in the container to its vaporization point. The surface of the coating in contact with the liquid is highly non-planar, that is, rough, so as to provide a multiplicity of nucleation points for a vaporization of the volatile liquid and also to provide a geometry for light scattering.

U.S. Pat. No. 3,612,653 to Jan A. Rajchman discloses a digital light deflector which includes an electrically conductive transparent film deposited on transparent substrate. The transparent film acts as a heating element and is immersed in a transparent liquid in a transparent container. Light is directed through the container to the film at an angle therewith. The light normally continues in a straight line through the film, the liquid and out one side of the container. When an electric current is applied to the film, heat is generated which vaporizes the liquid at the surface of the film and causes the light to be reflected by the film vapor interface and passes out through a different side of the container.

Japanese Patent Application No. 57-128566, filed July 23, 1982, and published without examination on Jan. 31, 1984 under Laid Open No. 59-18930 and assigned to Canon Incorporated discloses method and apparatus for modulating light by generating bubbles in a liquid in response to input signals which heat transparent or reflective heating elements to modulate incident light on the device by the bubbles.

An article entitled "Liquid Thermo-Optic Modulator" by K. Minoura et al, The 13th Congress of the International Commission for Optics, held Aug. 20-24, 1984, Sapporo, Japan, discloses a liquid thermo-optic modulator essentially comprising a liquid and a thin film heater. The liquid is enclosed with a transparent cover and a substrate with a heater. The electric current applied to the heater causes a gradient index distribution in the liquid. This index of refraction change by the temperature change in the liquid causes the incident light normally reflected from the heating element to be deformed. The non-deformed light is blocked by a stop and only the deformed light passes by the stop in a Schlieren optical system.

U.S. application Ser. No. 823,977, filed Jan. 30, 1986, entitled "Thermo-Optic Light Modulation Array", to Gerald Domoto et al, and assigned to the same assignee as the present invention, discloses an optical modulator wherein collimated light from a light source is passed through a lens system to produce and direct a sheet of light towards a photoconductive member of an electrophotographic printer. In one embodiment, a transparent medium is mounted over and in intimate contact with a linear array of heating elements. The transparent medium and heating element array are positioned between the lens system and the photoconductive member so that the sheet of light passes through the transparent medium and very close to the heating element. The heating elements are substantially parallel to the sheet of light and perpendicular to the direction of the sheet of light. Means are provided to energize selected heating elements for predetermined time periods in response to digitized data signals, in order to apply bursts of thermal energy to regions of the transparent medium in the immediate vicinity of the energized heating element. The burst of thermal energy temporarily changes the refractive index of the transparent medium for a relatively short time to refract a segment of a sheet of light passing through the transparent medium. A stop blocks all modulated portions of the sheet of light, while the unmodulated portions of the sheet of light continuously impinge upon a moving precharged photoconductive member. As is well known in electrophotography, electrostatic latent images are formed by exposing a precharged photoconductive member to light which discharges or erases the background areas of the image. Several embodiments are disclosed, and in one, the sheet of light enters the transparent medium and reflects off of the heating elements, exits the transparent medium in a direction to pass by or through a stop, and then impinges on the photoconductive member. Selective energization of the heating elements modulate the light. In an alternate embodiment of the reflective type, the heating element array may be two dimensional. In this case, the light beam has sufficient thickness to project a two dimensional image when the appropriate heating elements are energized. In another embodiment, the sheet of light passes through a transparent linear array of heating elements normal to the direction of light. The heating elements surround the surface of the transparent medium so that the unmodulated light impinges on the photoconductive member, selective energization of the heating elements prevents the portion of the light passing through the heating element from striking the photoconductive member. The transparent electrode is preferably configured in a grating pattern.

U.S. application Ser. No. 756,424, entitled "Thermo-Optic Light Valve", filed July 18, 1985, to Doyle Skinner, Jr., also assigned to the same assignee as the present invention, discloses a light modulating device comprising parallel glass substrates sandwiching therebetween an array of transparent electrodes and an opaque liquid. Selectively addressed heating elements form bubbles which push the opaque liquid aside, permitting light to pass therethrough.

When considered for use as an image bar for an electrophotographic printer, the above prior art suffers one or more disadvantages such as, for example, the requirement of complex optical systems, relatively slow imaging speed, low resolution, and shorter operating lifetimes than desired because of heating element failure or heating element to electrode interface failure. These shortcomings are overcome and other advantages achieved by the present invention.

SUMMARY OF THE INVENTION

It is an object of the present invention to provide an image bar for an electrophotographic printer which utilizes the mechanism of total internal reflection in a pair of fixed transparent prisms and a linear array of heating elements in intimate contact with a liquid medium sandwiched between the prisms to form an array of dot shutters to produce electrostatic latent images on a moving precharged photoconductive member of the printer, one row of picture elements or pixels at a time.

It is another object of this invention to provide a light shield within the gap between the pair of prisms to increase the contrast of the image bar.

It is still another object of this invention to provide means for prevention or removal of gases and contaminants in the liquid medium in the vicinity of the heating elements to maximize the transmittance of light therethrough and to optimize response time.

It is yet another object of this invention to provide a pagewidth, monolithic planar image bar structure having a dot shutter or spatial density of 300 or more pixels per inch (118 pixels per centimeter).

It is a further object of this invention to provide an image bar which selectively writes white on black or black on white.

It is still a further object of this invention to ensure long operating life of the heating elements by preventing their failure because of electromigration of metal from interconnecting electrodes thereto.

It is an additional object of this invention to provide means for self-pumping of the liquid medium past the heating elements in response to the generation and collapse of bubbles by the selectively addressed heating elements.

It is yet a further object of this invention to cause the liquid to be self-pumped past the transparent heating elements by providing a structure which forms a tunnel over each individual heating element when aligned therewith and fixedly positioned thereover.

In the present invention, a sheet of light from an elongated light source is directed to a photoconductive member of an electrophotographic printer. Optionally, light from a light source is passed through a lens system to produce and direct a sheet of light towards the photoconductive member. In one embodiment, a pair of transparent prisms having confronting parallel faces are fixedly mounted and hermetically sealed within a transparent structure. A linear array of transparent heating elements are formed on one of the confronting surfaces of the prisms, the transparent structure housing the prisms is filled with a liquid medium. The transparent structure housing the prisms and heating element array is positioned between the light source and/or lens system and the photoconductive member, so that the sheet of light passes through the transparent structure, the prisms, and the transparent heating elements on the prism surface. The liquid medium has an index of refraction substantially similar to that of the prisms, so that selectively energized heating elements in response to digitized data signals apply bursts of thermal energy to the liquid medium in the immediate vicinity of the energized heating element. The bursts of thermal energy temporarily changes the phase of the liquid medium and thus the refractive index for a relatively short time to modulate a segment of the sheet of light passing through the prisms and liquid medium, while the unmodulated portions of the sheet of light continuously impinges on the moving precharged photoconductive member. The vapor bubbles displace the liquid above each energized heating element to redirect that portion of the light beam by the mechanism of total internal reflection. As is well known in electrophotography, electrostatic latent images are formed by exposing a precharged, photoconductive member to light which discharges or erases the background areas of the image.

In another embodiment, the sheet of light enters the transparent structure and a single prism therein and, by total internal reflection, exits the transparent structure in a direction at an angle to the prism surface adjacent a liquid medium in contact therewith and impinges on the photoconductive member. Selective energization of the heating elements modulate the light and cause it to be directed to the photoconductor. The unmodulated light passes therethrough and is blocked by a stop.

Two approaches for constructing a long array of these devices are disclosed. In both cases, the prisms may be either cut from thin glass plates or made from injection molded plastics with glass microsheet cover layers. In one approach, one of the pair of prisms is larger than the other. An array of thin film transistors are fabricated on the hypotenuse of the larger prism, so that the larger surface area accommodates wire bonding to addressing electrodes or contains driver and logic IC chips (chip on glass), while in the other approach, the resistor array is constructed on a plate which is subsequently optically bonded to one of the prisms.

In another embodiment, the illumination source and optical coupling consist of a high intensity fluorescent or tungsten halogen lamp and Selfoc ® array optics on opposite sides of the pair of prisms sandwiching the linear array and liquid medium. The internally reflected light may be optionally used to provide selective writing of black on white or white on black. To obtain this capability, a pair of shutters is selectively operated by the printer's controller. When one shutter is closed and the other opened, it enables the unmodulated light to pass through the normally transmissive image bar, through the open shutter, and the Selfoc ® lens onto the photoconductive member. When the shutter positions are reversed, the total internally reflected light passes through the open shutter and is reflected by a mirror through a second Selfoc ® lens which focuses and directs light to the photoconductive member of the printer.

In still another embodiment, a structure having a series of parallel tunnels is aligned with and fixedly mounted over the transparent heating elements on one of the confronting, parallel surfaces of a pair of spaced prisms. Each end of the tunnels nearer to its associated heating element is closed, but has an opening in the tunnel above the heating element which serves as both aperture for passage of light and for the expulsion of liquid therethrough upon the generation of a temporary bubble by the heating element therebelow. This arrangement provides a self-pumping action for circulation of the liquid from a reservoir at the tunnel open ends, through the tunnels, and out the tunnel opening above each heating element.

These and other objects, together with a better understanding of the invention, will become apparent by referring to the following drawings in conjunction with the description, wherein like index numerals identify like parts.

DESCRIPTION OF THE PREFERRED EMBODIMENT

Figure 1:
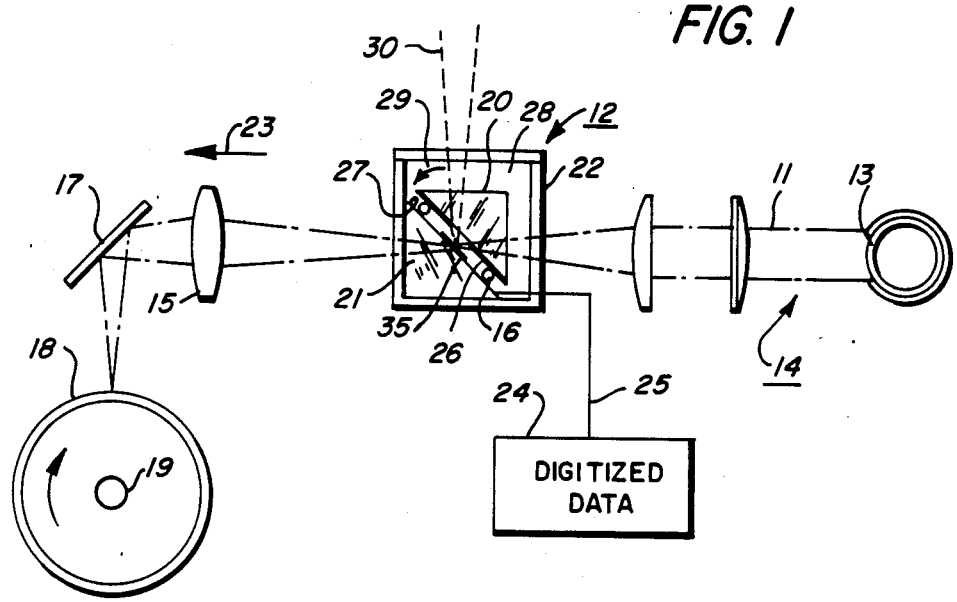
FIG. 1 is a schematic diagram of a side elevation view, partially sectioned, of an electrophotographic printer imaging system showing the thermally activated image bar of the present invention.
Figure 2:
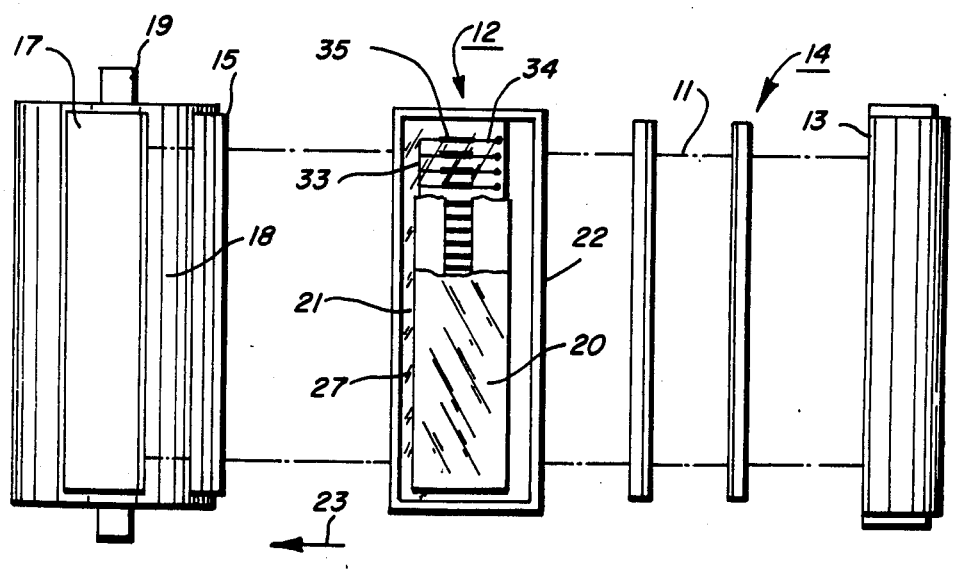
FIG. 2 is a schematic diagram of a plan view of the imaging system of FIG. 1.

In FIGS. 1 and 2, there is shown an imaging system 10 suitable for an electrophotographic printer and arranged in accordance with the present invention. For clarity, only the photoconductive member 18 of the photographic printer is shown, with all of the usual process stations removed; namely, the latent image erasing and precharging station, the development station, the transfer station, and the cleaning station are omitted. Although the embodiment of FIGS. 1 and 2 depicts the photoconductive member as a cylindrical drum, various other configurations (not shown) could be used, such as, for example, an endless belt configuration.

The imaging system 10 comprises a light source 13 which must emit or be adaptable for emitting light within the range of Selfoc ® lens acceptance angle. One convenient source of light is a fluorescent lamp or linear tungsten-halogen lamp and that is the light source used in the preferred embodiment. A laser (not shown), however, could be used. An optical input lens system 14, not required unless a laser is used, comprises a system of lenses to convert the light into a plane of light 11 and to a focal line in close proximity to the line of heating elements 35, discussed later, in the image bar 12. In this embodiment, the plane or sheet of light 11 is focused on the photoconductive member as a focal line parallel to the axis 19 of photoconductive member 18 by an output lens system 15. A mirror 17 reflects the sheet of light onto the photoconductive member at a predetermined position on the surface thereof; in FIG. 1, this is the twelve o'clock position, but this is, of course, discretionary, for the output lens system 15 could focus the light directly on the photoconductive member.

Located between the input lens system 14 and the output lens system 15 is a thermally activated image bar 12. The image bar comprises a pair of prisms 20, 21, each having a face 26, 27, confronting each other but spaced apart by spacers 16 to maintain the confronting faces parallel with each other. The pair of prisms are mounted in a transparent housing 22, and a liquid medium 28 is used to fill the transparent housing. The liquid medium 28 is hermetically sealed by the transparent housing. As shown in FIG. 2, a linear array of transparent heating elements 35 are formed on the surface 27 of prism 21. The heating elements may be selectively addressed by electrodes 34 and common return 33, also formed on surface 27 of prism 21. In the preferred embodiment, the liquid medium is refraction index matched to the prisms and is circulated through the confronting prism surfaces 26, 27 via self-pumping action discussed more fully later. The sheet of light 11 is intercepted by the image bar and is transmitted therethrough, unencumbered on its way to the photoconductive member via the output lens system. The liquid medium may be, for example, propanol, liquid freon, acetone, or any other index refraction matching liquid with similar thermodynamic characteristics.

Voltages are selectively applied to the individual heating elements 35 of the array for a predetermined time period through, for example, a ribbon conduit 25 from an electronic controller or microprocessor 24. The selectively applied voltages are in response to receipt of digitized data by the controller from a source such as a character generator, CCD scanner at a document scanning station, or a computer (not shown). Localized rapidly developed vapor bubbles are produced and collapsed in the transparent medium 28 by the transfer of thermal energy pulses from the heating elements 35 to the medium. Since the liquid medium 28 has an index of refraction substantially matched to that of the prisms, light travels therethrough unless a bubble is formed presenting portions of the sheet of light with a different index of refraction, thus modulating or redirecting the light in another direction by the mechanism of total internal reflection, as indicated by the dashed light beam 30. The direction of the light as shown by arrow 23 depicts the unmodulated direction of light passing through the image bar and impinging on the photoconductive member.

As is well known in electrophotography, the electrostatic latent image is formed by directing light onto the precharged background regions of the latent image to remove the charges in the background region, thus leaving the image areas charged and available for development with oppositely charged developer or toner particles. This is referred to as writing black on white. For writing white on black, the image areas are erased.

For efficient light transmission or modulation by the image bar 12, the sheet of light 11 should pass through the heating elements which thus must be transparent. For example, the heating elements may be indium-tin-oxide (ITO) and the addressing electrodes 34 and common return 33 may be aluminum.

Figure 3:
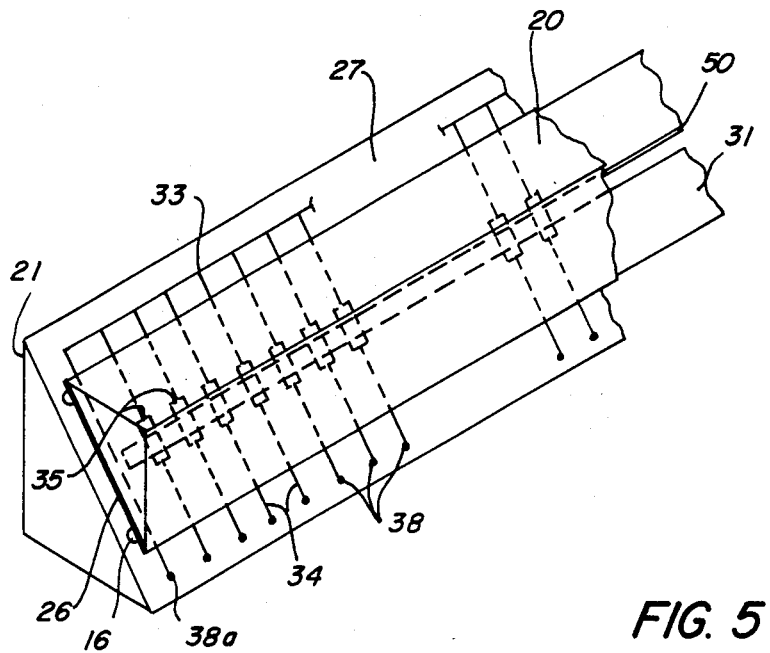
FIG. 3 is an isometric view of the prisms of one embodiment of the present invention, wherein one of the prisms of the image bar is larger for better accommodating the electrical leads which address the heating elements.
Figure 4:
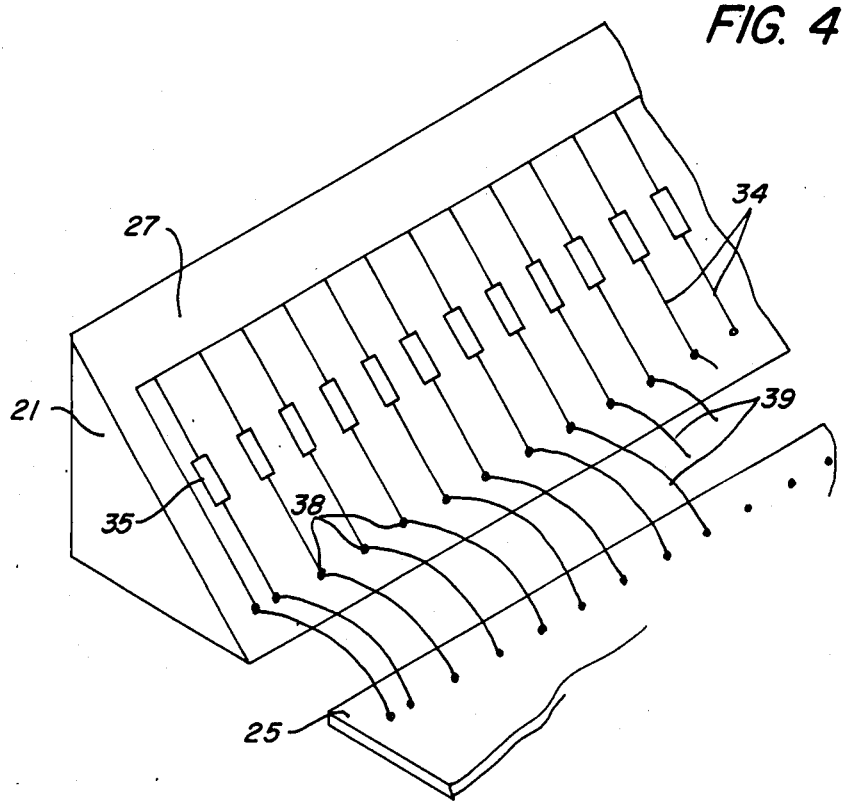
FIG. 4 is an enlarged isometric view of the larger prism schematically showing the heating elements and electrodes and wire bonds to connecting electrodes to an electrical source.
Figure 8:
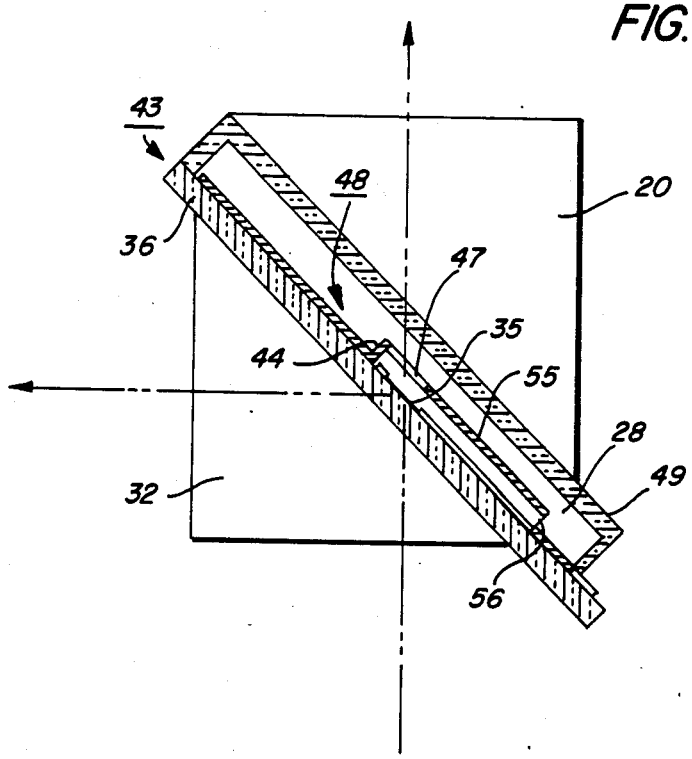
FIG. 8 is an enlarged cross-sectional schematic view of an alternate embodiment of the present invention showing a pair of prisms sandwiching a transparent liquid medium enclosure containing a tunnel structure which defines light passing apertures, and provides means for self-pumping of the liquid medium.
Figure 9:
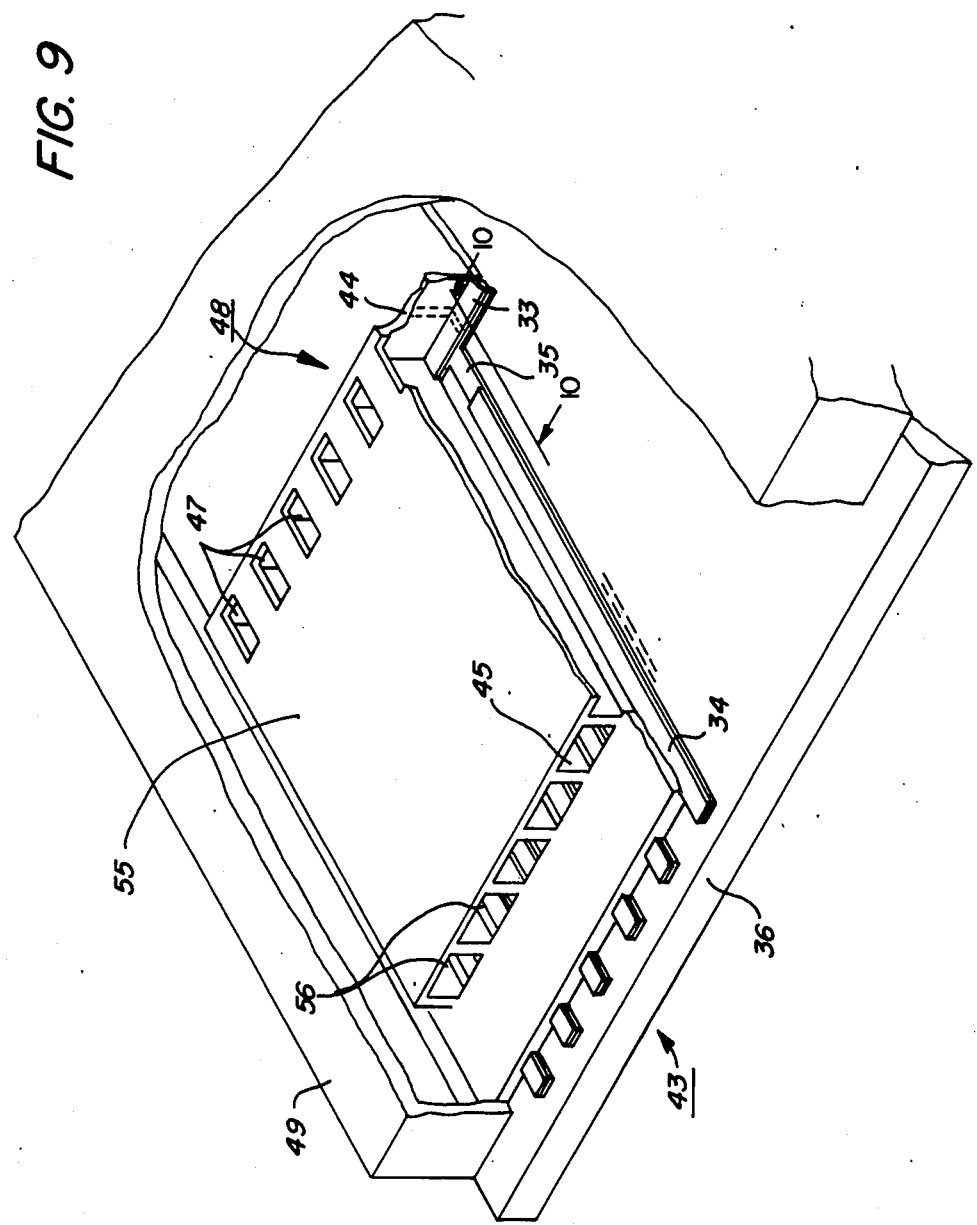
FIG. 9 is a partial, exploded isometric view of the tunnel structure and bottom substrate of the liquid medium enclosure of FIG. 8.

A schematic, isometric view of the pair of prisms 20, 21 is shown in FIG. 3, with only a few electrodes depicted, rather than the typical 300/inch or 118/cm for ease of understanding the invention. Common return 33 terminates at terminal 38a, along with all of the addressing electrode terminals 38 for ease of wire bonding to the ribbon conduit 25 (see FIG. 4) or other intermediate electrode circuit board (not shown). The heating elements 35 are shown in dashed line and part of the upper prism 20 is removed to show the aperture mask 31 formed on the surface 26 of prism 20 through which the sheet of light travels. The aperture may be one elongated slit 50 as shown in FIGS. 2 and 3, or may be a linear array of openings 47 as shown in FIGS. 8 and 9. In this configuration, the lower prism 21 is larger than its other associated prism 20 in order to provide a larger confronting surface 27 to better accommodate the array of transparent heating elements 35, addressing electrodes 34, and common return 33. Spacers 16 which may be, for example, fixedly positioned glass beads, maintain the confronting surfaces of the prisms parallel with each other. In FIG. 4, the upper prism 20 and mask 31 are omitted to better shown the transparent heating electrodes 35 and further to show the wire bonds 39 interconnecting the electrode terminals 38 with the terminals on the ribbon conduit 25. Alternatively, the electrode terminals may be connected to driver and logic chips (not shown) bonded to flat plate 36. This would reduce the number of leads required for wire bonding to the flat plate 36.

Figure 5:
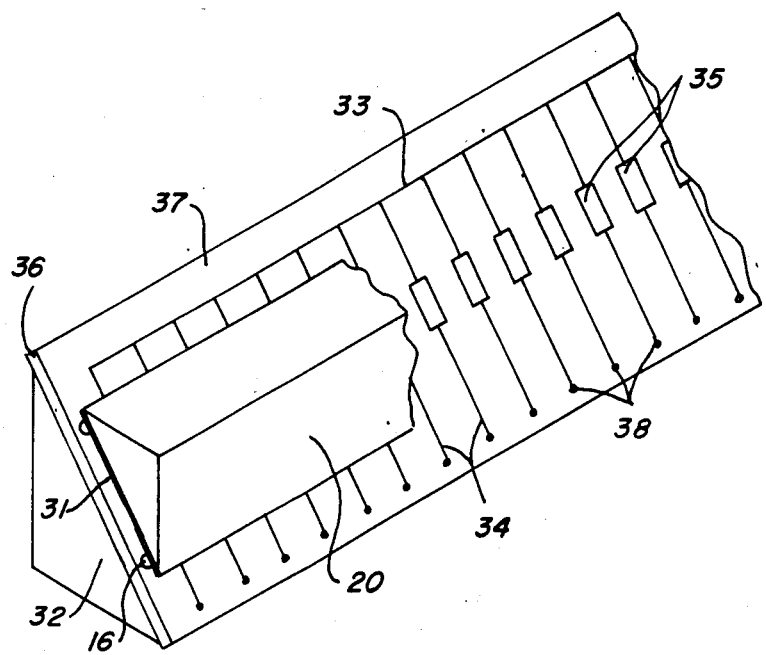
FIG. 5 is an isometric view of an alternate embodiment of FIG. 3 wherein the array of heating elements and electrical leads are formed on a separate planar substrate which is optically bonded to one of the prism surfaces.

An alternate embodiment is shown in FIG. 5, wherein a transparent, flat dielectric plate 36, such as glass or plastic, is used for more convenient fabrication of the array of transparent heating elements 35 and associated electrodes 33, 34. Once the heating elements and electrodes are formed on surface 37 of the plate 36, it is optically bonded to a prism 32, which may be identical with upper prism 20. Optical light shield or mask 31 is mounted on the surface of prism 20 which confronts plate surface 37 with the heating elements 35.

Alternatively, the optical light shield may be placed on the surface of flat plate 36 opposite the surface having the heating elements and addressing electrodes thereon (not shown). Spacers 16 maintain the confronting surfaces parallel.

Figure 6:
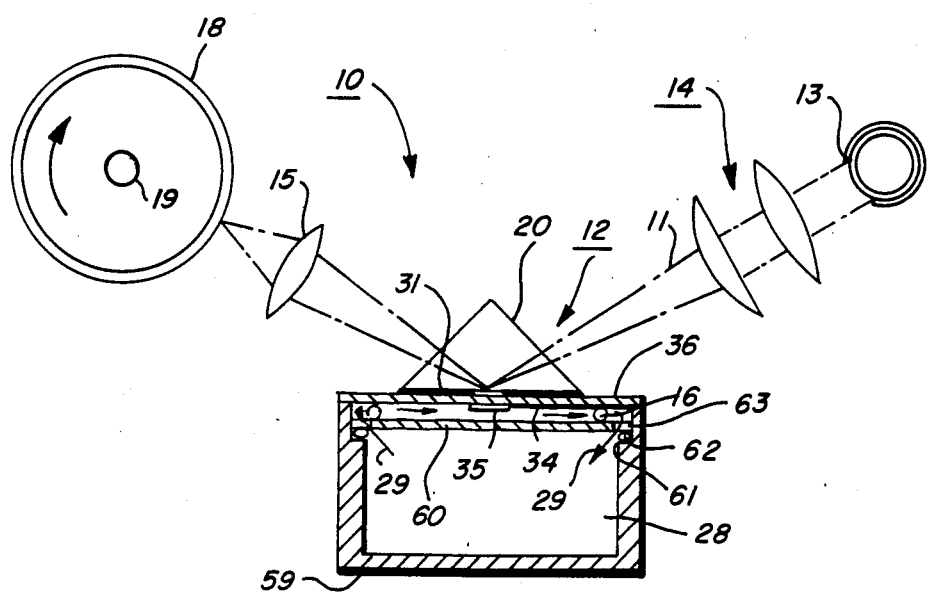
FIG. 6 is another embodiment of the present invention wherein only one prism is used for imaging the photoconductive member by total internal reflection.

Referring to FIG. 6, an alternate embodiment of the printer 10 is shown, wherein only one prism 20 is used that is resting on one surface of the transparent flat plate 36 opposite the surface containing the array of heating elements 35 and electrodes. Optical shield 31 is sandwiched between the prism 20 of the flat plate 36 with its elongated slit 50 aligned with the heating elements 35. The flat plate 36 is hermetically sealed to the housing 59, containing the transparent liquid medium 28. The liquid medium completely fills the sealed housing, so that the liquid medium is in constant contact with the heating elements 35. The index of refraction of a liquid medium 28 is matched to that of prism 20 and flat plate 36, so that when the momentary vapor bubbles are selectively formed by the heating elements, the portions of the sheet of light 11 striking the prism surface 26 contacting the bubbles are deflected to the photoconductive member 18 by total internal reflection. The liquid medium is circulated between the flat plate 36, which is optically bonded to the prism 20, and an opaque or light absorbing circulating plate 60 by the self-pumping action caused by the growth and collapse of bubbles as indicated by arrow 29 to remove any trapped gases in the form of entrained microbubbles or particulate that might later accumulate around or precipitate onto the heating elements and interfere with the operation of the image bar 12. Since the liquid medium is hermetically sealed, circulation may optionally be accomplished by convection or by separate pump, not shown. If the liquid medium is properly filtered and degassed, microbubbles are less likely to be a problem, but some liquid medium circulation is preferred in all embodiments. Shelf 61 is formed on opposing internal walls of the housing 59 to support the circulating plate 60. A resilient means 62, such as relatively soft rubber or the like, is placed between the circulating plate and the shelf 61 to provide a means for urging the circulating plate into contact with spacers 16 which maintain the circulating plate parallel with the flat plate 36 bearing the heating elements and thus a uniform gap therebetween. Notches 63 in the circulating plate near the portion resting on the shelves 61 permit the liquid medium 28 to circulate.

Figure 7:
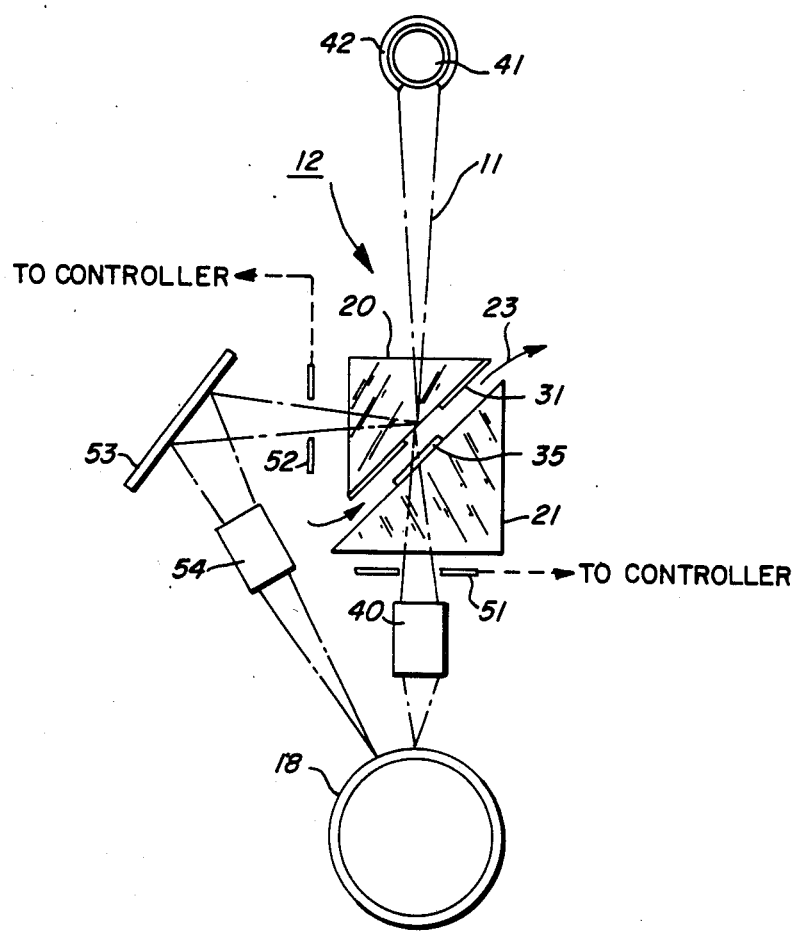
FIG. 7 depicts another embodiment of the present invention in a schematic elevation view wherein the illumination source and optical coupling with the pair of prisms is a high intensity, elongated lamp, and Selfoc ® lens optics. In this configuration the photoconductive member may be imaged by total internally reflected light or by directly passed light, depending on which shutter is opened.

FIG. 7 depicts an alternative embodiment to that depicted in FIGS. 1 and 6. A high intensity fluorescent lamp 41 with shield 42 forms the sheet of light 11 within the range of Selfoc ® lens 40. Upper prism 20 contains the aperture mask 31 which provides an optical shield to increase the contrast ratio of the image bar 12. The liquid medium is circulated between the prisms 20, 21 in the direction of arrows 29 by self-pumping action or other circulating means. The liquid medium 28 has its index of refraction matched to that of the prisms 20, 21 so that the sheet of light travels through the image bar 12 onto a Selfoc ® optical lens array 40 and onto the photoconductive member 18, when shutter 51 is selectively opened and shutter 52 closed by the controller. The heating elements 35 are selectively addressed with a current pulse from the controller (not shown) to form bubbles momentarily in the liquid medium (not shown). The bubbles displace the liquid medium from the gap or space between the prisms, thus causing the sheet of light to encounter a medium having a different index of refraction (i.e., bubbles), whereby the portion of the sheet of light encountering the vapor bubble is internally reflected.

When shutter 51 is closed and shutter 52 is opened by the ink jet printer's controller, the modulated portion of the sheet of light (i.e., the portion of light which is internally reflected), exits through the shutter 52 and reflects from mirror 53. The light from the mirror enters a second Selfoc ® optical lens array 54 and is focused thereby onto the photoconductive member 18. One shutter, for example 51, may permit erasure of background areas to produce the latent electrostatic image for black on white writing, while the other shutter permits erasure of the image areas to produce the latent electrostatic image for white on black writing. The visible image is, of course, obtained after the latent electrostatic image is developed by the printer's developing station (not shown). The embodiment of FIG. 7, therefore, shows a printer which has the capability of selectively producing images that may be transferred to paper which are either black on a white background or vice versa.

FIGS. 8 and 9 show the preferred embodiment. Sandwiched between confronting surfaces of the prisms 20 and 32 is a transparent hermetically sealed glass or plastic enclosure 43 composed of transparent flat plate 36 and transparent cover 49. Flat plate 36 contains the transparent heating elements 35, addressing electrodes 34, and common return 33. An opaque integrated tunnel structure 48 for promoting circulation of the liquid medium and providing the optical shield is bonded to the surface of the flat plate 36. The tunnel structure has a plurality of parallel tunnels 46, one for each heating element. The tunnels are aligned with the heating elements 35 and each tunnel 46 has an aperture 47 directly above the heating elements and adjacent the closed end wall 44 of the tunnels. Vertical, parallel walls 45 in a raised portion 55 of the tunnel structure form the individual tunnels 46. Open tunnel ends 56 permit the circulation of the liquid medium 28 which fills the transparent enclosure. The index of refraction of the liquid medium is substantially matched to that of the transparent prisms 20, 32 and the transparent enclosure 43. During operation, the momentarily formed bubbles push a quantity of liquid medium through the apertures and the liquid medium moves up the tunnel from the open end 56 to replace the expelled liquid medium as the bubbles collapse. Thus, the momentary bubbles cause light modulation by the image bar and a self-pumping action which circulates the liquid medium. Any thick film material such as Riston ® is acceptable for the integral tunnel structure and optical shield.

Figure 10:
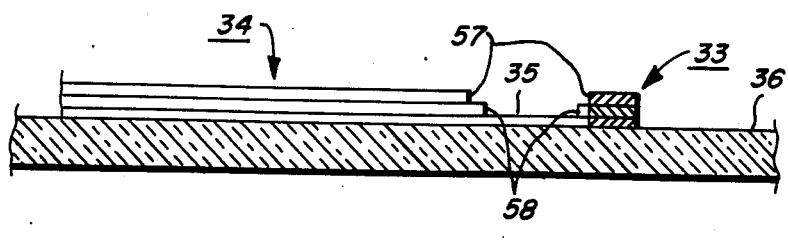
FIG. 10 is a cross-sectional view of the heating elements and addressing electrodes of the present invention arranged to prevent premature failure.

Though FIG. 10 is a cross-sectional view of a heating element 35, addressing electrode 34, and common return 33 as viewed along view line 10—10 of FIG. 9, it is representative of the heating elements and electrodes in all of the embodiments. The electrodes, common return, and heating elements are patterned with ITO on the surface of flat plate 36, and then an aluminum layer is deposited over the ITO electrodes and common return. To prevent premature failure of the ITO heating elements because of electromigration of aluminum to the ITO, a layer of chromium is deposited over the portion of the ITO pattern forming the electrodes and common return prior to the deposition of the aluminum. The layer of aluminum deposited over the chromium completes the formation of the electrodes and common return. However, the aluminum edge 57 is recessed back from the chromium edge 58 forming the connection or interface with the heating elements 35. This recessing of the aluminum prevents electromigration and increases the operating lifetime of the heating elements.

Many modifications and variations are apparent from the foregoing description of the invention and all such modifications and variations are intended to be within the scope of the present invention.

We claim:

1. A thermally activated image bar for use in an electrophotographic printer to form latent electrostatic images on a photoconductive member of the printer one line of pixels at a time, comprising:
    at least one transparent prism having a flat surface;
    a transparent member having an index of refraction similar to that of the prism and having at least one flat surface;
    means to maintain the prism and the member in fixed relationship to each other, so that their respective surfaces confront and are spaced parallel with each other to form a uniformly thick gap therebetween;
    a liquid medium hermetically sealed between the confronting surfaces of the prism and member, the liquid medium having an index of refraction substantially matched to that of the prism and the member;
    an optical shield being formed on the prism surface having at least one aperture therein for the passage of light therethrough;
    a linear array of transparent heating elements and associated addressing electrodes therefor being formed on the member flat surface, the heating elements being aligned with said at least one aperture;
    means to direct a sheet of light to the photoconductive member through the image bar, so that the sheet of light passes through the prism, optical shield aperture, and the liquid medium in the gap before it strikes the array of heating elements and exits from the member; and
    means for selectively applying current pulses to the heating elements in response to digitized data signals to form momentary vapor bubbles in the liquid medium, the bubbles providing an index of refraction different from the liquid medium, thereby modulating portions of the sheet of light passing therethrough by the mechanism of total internal reflection.

2. The image bar of claim 1, wherein the image bar further comprises:
    first and second shutters operated by a printer controller to open one shutter and to close the other selectively, the first shutter receiving the unmodulated portions of the sheet of light and the second shutter receiving the modulated portions of the sheet of light;
    first Selfoc ® lens array for receiving the unmodulated light from the first shutter when it is opened;
    a mirror reflecting the modulated light from the second shutter, when it is opened, to a second Selfoc ® lens array;
    the first and second lens arrays focusing the light passed by its respective selectively opened shutter, so that the printer may selectively erase either the background areas or the image areas, thereby providing the capability to write black on white or white on black.

3. The image bar of claim 1, wherein the image bar further comprises:
    a transparent housing for hermetically sealing the prism, member, and liquid medium within the housing, the addressing electrodes having a common return with both the electrodes and common return, sealingly penetrating the housing to interconnect terminals accessible for wire bonding to a voltage source.

4. The image bar of claim 3, wherein the image bar further comprises means for circulating the liquid medium to prevent the accumulation of entrained microbubbles of vapor or contaminates in the vicinity of the heating elements.

5. The image bar of claim 3, wherein the transparent member is a second prism and its flat surface is larger than the confronting flat surface of the other prism to better accomodate the fabrication of the heating elements and addressing electrodes thereon.

6. The image bar of claim 3, wherein the aperture of the optical shield is a slot aligned with the heating elements.

7. The image bar of claim 3, wherein the aperture of the optical shield is a linear array of individual openings, each opening being aligned with a heating element.

8. The image bar of claim 3 wherein the transparent member is a second prism and flat substrate optically bonded thereto, the flat substrate having the heating elements and addressing electrodes patterned thereon prior to being bonded to the second prism.

9. The image bar of claim 8, wherein the addressing electrodes include a common return and the flat substrate has at least one edge, each electrode end opposite the one connecting to a respective heating element terminates with a terminal in the vicinity to flat substrate edge to accommodate wire bonding of a ribbon connector thereto.

10. The image bar of claim 9, wherein the ends of the electrodes opposite the ones connecting to the heating elements are connected to drivers and logic chips bonded to the flat substrate to reduce the number of wire bonding terminals and to eliminate the need for a ribbon connector.

11. The image bar of claim 1, wherein the transparent member is a second prism; and wherein the means to maintain the prisms in fixed spaced relationship is a transparent, flat enclosure comprising a transparent flat substrate and a recessed transparent flat cover, the flat substrate having the heating elements and addressing formed thereon with the optical shield being positioned thereon over the heating elements and addressing electrodes, the shield aperture being aligned with the heating elements, the cover being sealing attached to the flat substrate with the recess confronting the heating elements to form the gap which holds the liquid medium therein.

12. The image bar of claim 11, wherein the optical shield is an opaque integral structure having a plurality of parallel tunnels, one for each heating element which are open on one end and closed on the other end, each tunnel having an opening adjacent its closed end which is aligned with and parallel to its associated heating element, so that the tunnel opening functions as a light passing aperture for each heating element in the integral structure and concurrently promotes circulation of the liquid medium by a self-pumping action when the temporary bubbles are formed which expel the liquid medium above the heating elements through the tunnel apertures.

13. The image bar of claim 1, wherein the heating elements are a patterned layer of indium-tin-oxide (ITO) and the addressing electrodes include both individual electrodes that interconnect to the heating elements and a common return that also interconnects to the heating elements, the electrodes and common return are composed of three layers, a chromium layer over the ITO layer and an aluminum layer over the chromium layer, and at the interconnections with the heating elements, the aluminum layer is offset or recessed from the heating elements to prevent electromigration of aluminum to the heating elements, thereby ensuring a long operating life for these electrode to heating element interfaces.

14. A thermally activated image bar for use in an electrophotographic printer to form latent electrostatic images on a photoconductive member of the printer one line of pixels at a time, comprising:

a transparent prism having a flat surface;

a transparent flat substrate having an index of refraction similar to that of the prism and having parallel opposing surfaces, an optical shield with an elongated slit therein being formed on one of the flat substrate surfaces in alignment with an array of transparent heating elements formed on the other flat substrate surface, the heating elements each having an associated addressing electrode, said optical shield and heating elements together with their associated electrodes being formed on the opposing surfaces of the flat substrate prior to said flat substrate being optically bonded to the prism in a manner such that the optical shield is sandwiched between the prism and the flat substrate;

a liquid medium having an index of refraction substantially matched to that of the prism and flat substrate;

a housing for containing a quantity of the liquid medium, the flat substrate forming one of the housing walls and hermetically sealing the liquid medium therein;

a circulating plate having openings at opposing ends and being mounted internally of the housing, so that it is spaced from and parallel to the flat substrate to form a uniform gap between them, the circulating plate openings providing means for circulation of the liquid medium through the uniform gap when the heating elements produce vapor bubbles in the liquid medium;

means to direct and focus a sheet of light through the prism, optical shield aperture, and flat substrate as a first focal line of light on the array of heating elements; and means for selectively applying current pulses to the heating elements in response to digitized data signals to form momentary vapor bubbles in the liquid medium, the bubbles providing an index of refraction different from the liquid medium, thereby modulating portions of the first focal line of light and passing the modulated portions thereof from the prism by the mechanism of total internal reflection and onto the photoconductive member.

15. The image bar of claim 14, wherein the optical shield slit is an array of individual apertures, one for each heating element; and wherein a lens means focuses the modulated exiting from the prism onto the photoconductive member as a second focal line.

* * * * *